(12) United States Patent
Jensen et al.

(10) Patent No.: US 9,989,164 B1
(45) Date of Patent: Jun. 5, 2018

(54) AIR-OPERATED, MAGNETIC, NON-STALL AIR DIRECTIONAL CONTROL VALVE

(71) Applicant: Trebor International, West Jordan, UT (US)

(72) Inventors: Craig Lee Jensen, Riverton, UT (US); Cody Lee Gehrke, South Jordan, UT (US); Ronald Eugene Childers, South Jordan, UT (US)

(73) Assignee: TREBOR INTERNATIONAL, West Jordan, UT (US)

( * ) Notice: Subject to any disclaimer, the term of this patent is extended or adjusted under 35 U.S.C. 154(b) by 31 days.

(21) Appl. No.: 15/091,000

(22) Filed: Apr. 5, 2016

(51) Int. Cl.
*F16K 31/08* (2006.01)
*F16K 31/06* (2006.01)
*F16K 11/065* (2006.01)

(52) U.S. Cl.
CPC ........ *F16K 31/0613* (2013.01); *F16K 11/065* (2013.01); *F16K 31/08* (2013.01)

(58) Field of Classification Search
USPC .......................................................... 251/65
See application file for complete search history.

(56) References Cited

U.S. PATENT DOCUMENTS

| | | | | |
|---|---|---|---|---|
| 6,470,905 B2 * | 10/2002 | Im | ........................ | F16K 31/082 137/39 |
| 7,448,411 B2 * | 11/2008 | Friedman | .............. | F16K 11/044 137/625.48 |
| 7,603,854 B2 * | 10/2009 | Strong | .................. | B05B 7/0093 60/370 |
| 8,622,720 B2 | 1/2014 | Simmons et al. | | |

* cited by examiner

*Primary Examiner* — John Fox
(74) *Attorney, Agent, or Firm* — Workman Nydegger

(57) ABSTRACT

In one example, a valve includes a body defining a chamber, and a spool disposed in the chamber and configured to move within the chamber, such that a first operating position of the valve is defined when the spool is in a first position in the chamber, and a second operating position of the valve is defined when the spool is in a second position in the chamber. The valve also includes a magnetic element connected to the spool and responsive to a magnetic field such that the spool is biased in a first direction when the spool is in the first position and the spool is biased in a second direction when the spool is in the second position, and the second direction is different from the first direction.

15 Claims, 13 Drawing Sheets

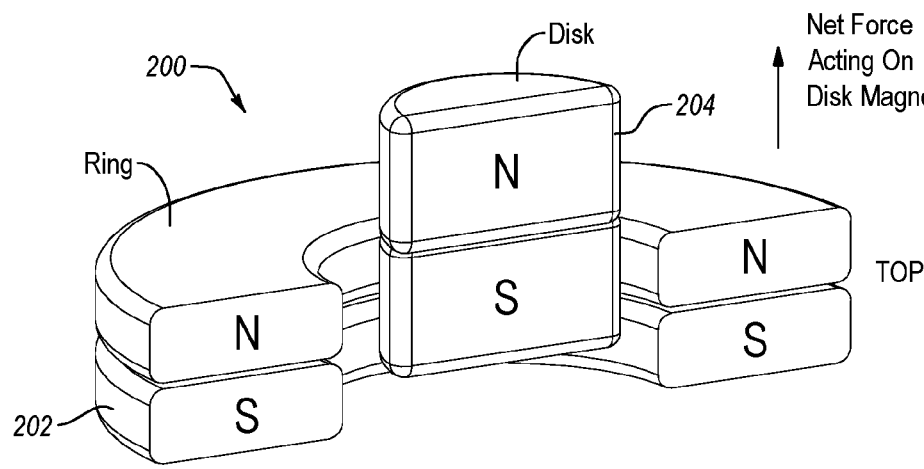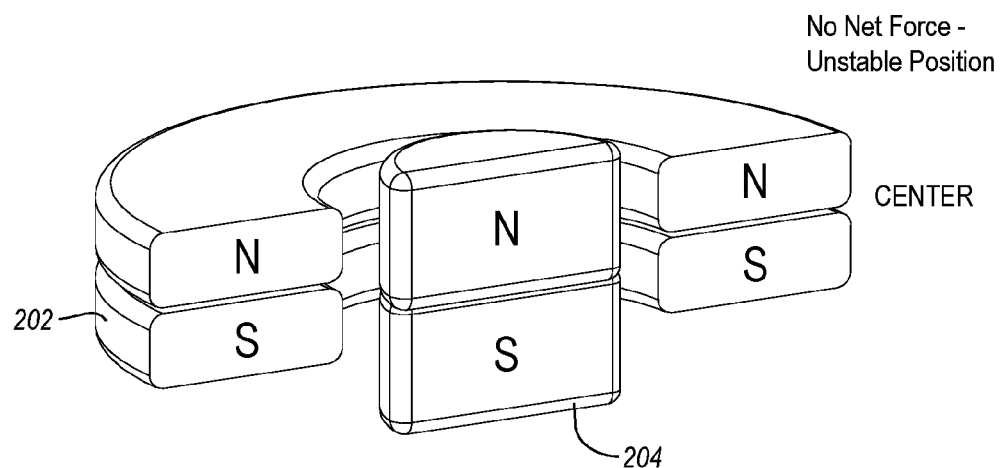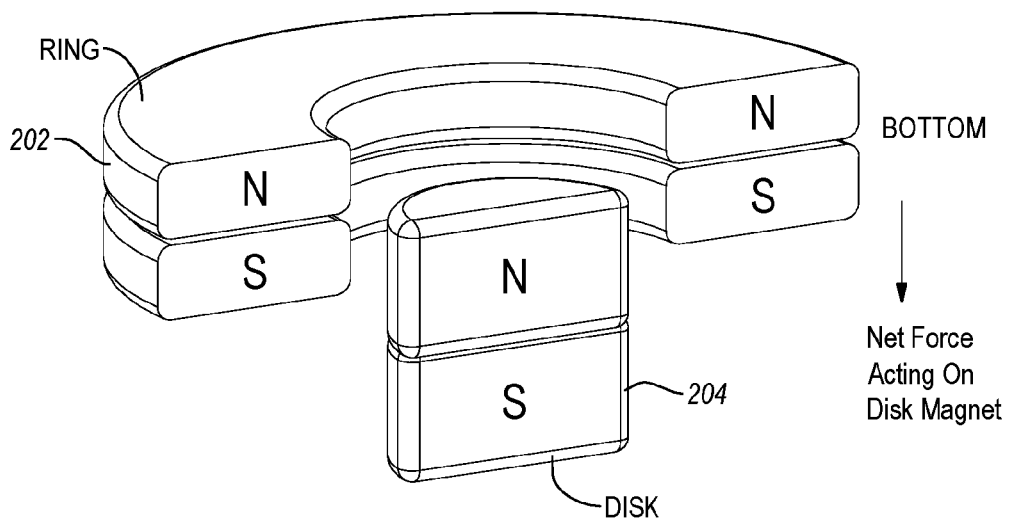
FIG. 2

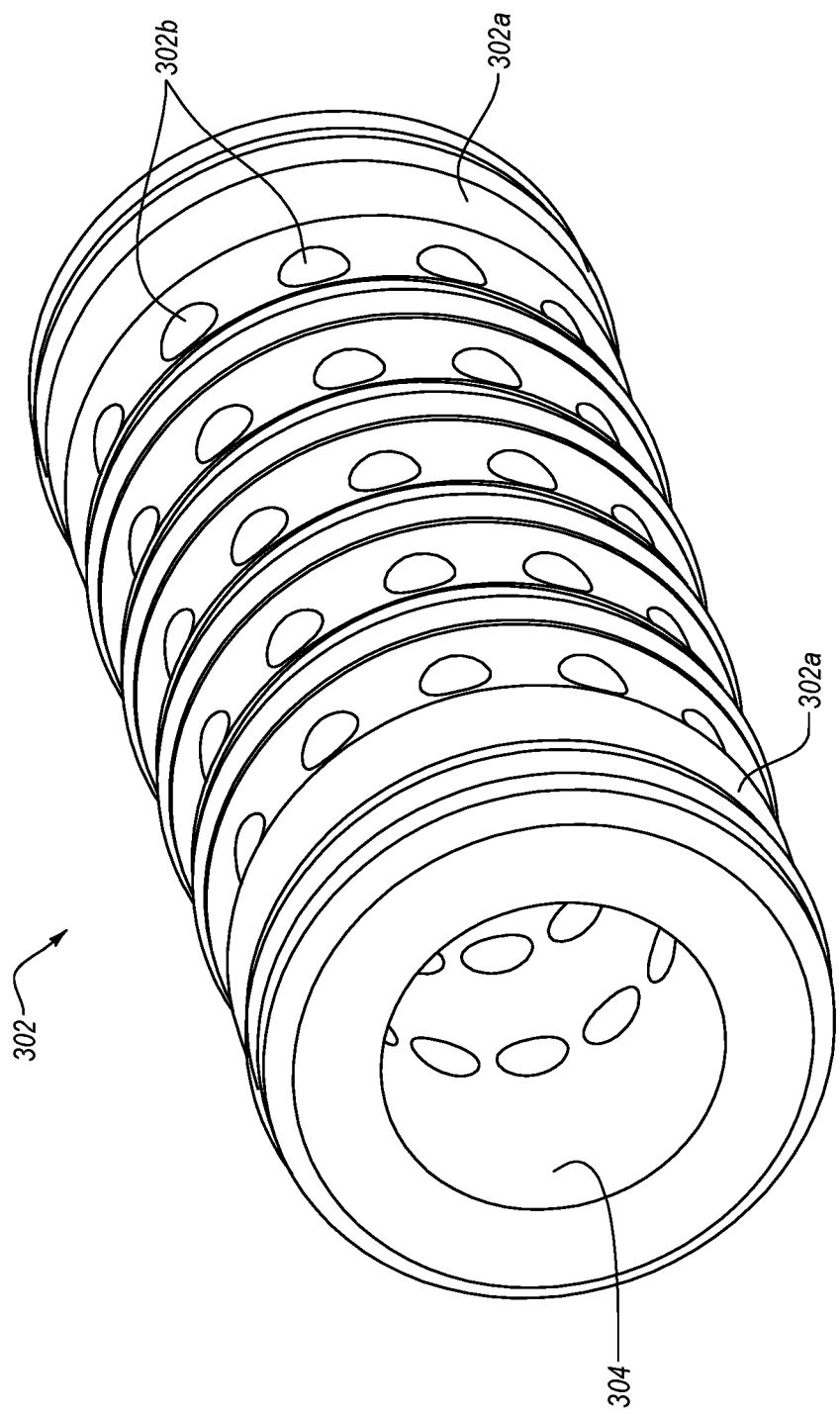

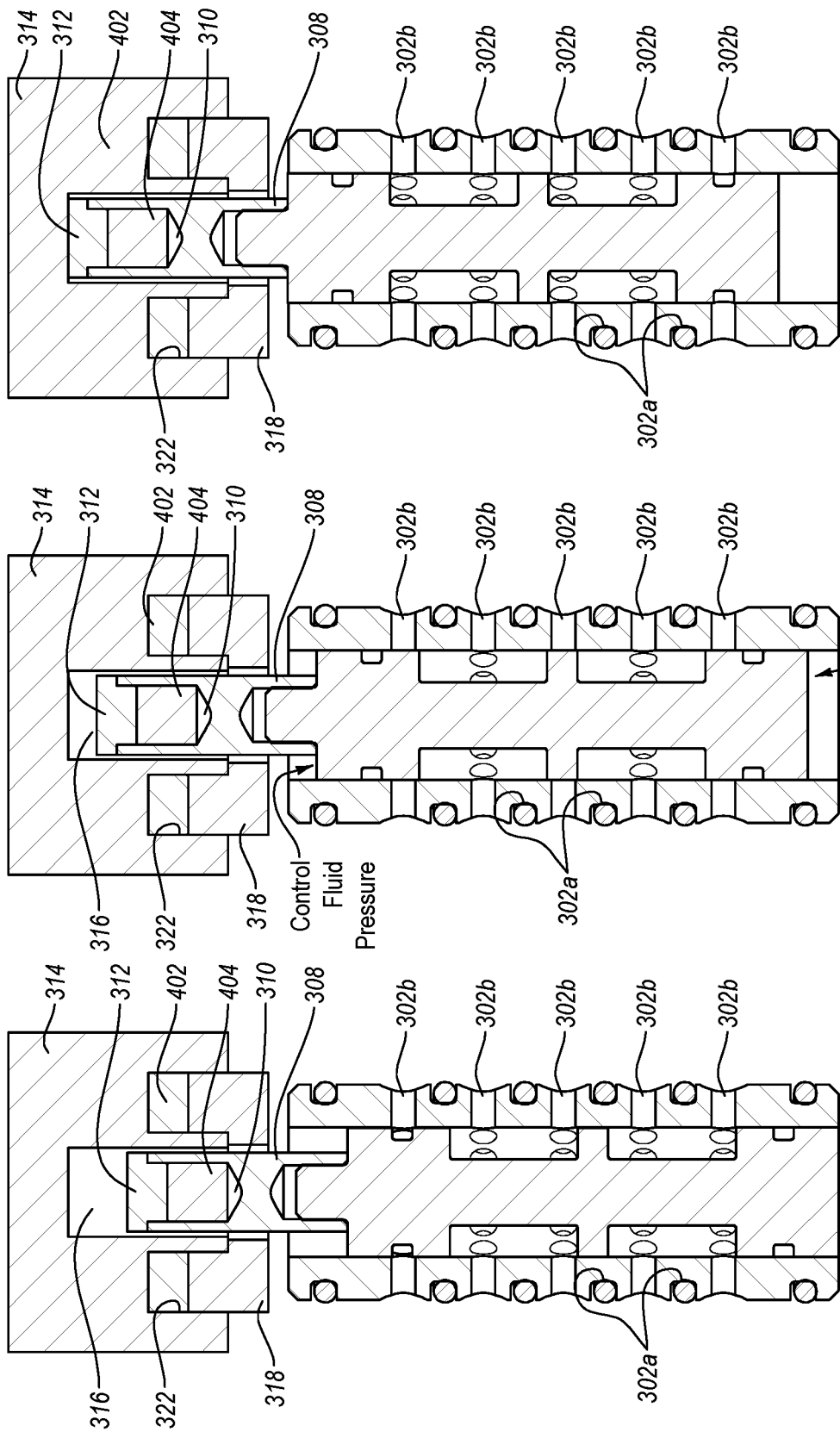

AIR-OPERATED, MAGNETIC, NON-STALL AIR DIRECTIONAL CONTROL VALVE

FIELD OF THE INVENTION

The present disclosure is generally concerned with fluid system components. More specifically, at least some of the disclosed embodiments concern control valves configured to be operated by a control fluid. In some embodiments, the control valve can be a directional control valve.

BACKGROUND

Control valves are employed in a variety of fluid systems and applications to control the operation of hydraulic and pneumatic machinery, for example. In general, a directional control valve is configured to enable definition of a variety of different internal pathways through which a fluid can flow. Changes to these different pathways can be effected with the use of a spool that moves within a chamber. The body of the spool can be configured to interface with the chamber structure such that as the spool moves within the chamber, the spool may close off one or more fluid pathways, while opening up one or more other fluid pathways. In this way, the spool controls the flow of a fluid through the control valve. Movement of the spool can be achieved with the use of a pressurized control fluid that acts on different portions of the spool to move the spool to/from a desired position.

Because a control valve relies for its operational effectiveness on the positioning of the spool in one or more specific operational positions, it is important to the operation of the control valve to ensure that the spool does not remain in a position other than one of the specific operational positions. Accordingly, some control valve designs include one or more springs, each of which serves to bias the spool toward a particular one of the specific operational positions. In this way, the springs are able to prevent the spool from remaining in some intermediate position that is other than one of the specific operational positions, and the springs thus contribute to the operational effectiveness of the control valve.

While springs such as those described above provide some benefits, they can nonetheless be problematic. For example, because springs are mechanical components, they wear out over time. In particular, the physical contact between the springs and the spool/chamber can contribute to wearing of the springs, and the spool/chamber in some cases. As the springs wear, they may shed metal and/or other particles. Likewise, components in contact with the springs may shed metal and/or other particles as well. This wearing of the springs may manifest itself, for example, as reduced control valve performance. Eventually the control valve performance deteriorate to the point that the springs require replacement. Typically, replacement of the springs involves disassembly and reassembly of the control valve, which can be expensive and time consuming.

In light of these, and other, problems, it would be useful to be able to be able to provide a control valve configured so that the spool does not remain in a position other than one of the specific operational positions. It would also be useful to be able to move the spool to specific operational positions in a manner that reduces, or eliminates, the mechanical wearing associated with designs that employ springs for this purpose. As well, it would be useful to be able to bias the spool into each of a plurality of different operational positions.

ASPECTS OF SOME EXAMPLE EMBODIMENTS

It should be noted that the embodiments disclosed herein do not constitute an exhaustive summary of all possible embodiments, nor does this brief summary constitute an exhaustive list of all aspects of any particular embodiment(s). Rather, this brief summary simply presents selected aspects of some example embodiments. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular technical effect(s) or solution(s).

Disclosed embodiments are generally concerned with control valves. Such control valves can be used in any of a variety of systems, components and applications. As such, this disclosure is intended to be broad in scope and is not limited to any particular configuration(s) of, or application(s) for, the example disclosed control valves and control valve components.

Embodiments within the scope of this disclosure may include any one or more of the following elements, and features of elements, in any combination: a control valve; a directional control valve with two or more operating positions; a control valve that includes a spool movable within the control valve and configured to cooperate with one or more other components of the control valve to define one or more specific operational configurations; a control valve configured to assume one or more specific operational configurations, each of which corresponds to a different respective fluid pathway through the control valve; first and second magnets with different respective physical configurations; first and second magnets with substantially the same physical configuration as each other; first and second magnets connected, or connectible, to respective first and second components of a control valve such that the magnets cooperate with each other to bias a component of the control valve toward a particular position and/or away from another particular position; first and second permanent magnets; a control valve configured to be controlled by a control fluid; an assembly that includes a spool to which a magnet is attached; an assembly that includes a control valve component to which a magnet is attached; one or more permanent magnets; a pair of magnets arranged such that the distance between the magnets can change; a pair of magnets, one of which is a permanent magnet and the other of which is an electromagnet; a pair of magnets arranged such that the magnets collectively tend to assume one of two different arrangements; a pair of magnets arranged such that a net force acts on one of the magnets in one of two different directions; a pair of magnets arranged such that the magnets can collectively assume at least three different arrangements, two of which are relatively more stable than a third; a pair of magnets, where one magnet is larger than the other; a pair of magnets arranged such that neither contacts the other; a pair of magnets oriented with like poles facing the same direction; and, a pair of concentric magnets.

BRIEF DESCRIPTION OF THE DRAWINGS

The appended drawings contain figures of some example embodiments to further clarify various aspects of the present disclosure. It will be appreciated that these drawings depict only some embodiments of the disclosure and are not intended to limit its scope in any way. The disclosure will be described and explained with additional specificity and detail through the use of the accompanying drawings in which:

FIG. 2 is a diagram directed to aspects of the relationship between a pair of magnets utilized in a directional control valve;

FIG. 4 discloses aspects of an example control valve body;

FIGS. 5a-5c are section views of an embodiment of a directional control valve that includes a pair of magnets.

DETAILED DESCRIPTION OF SOME EXAMPLE EMBODIMENTS

Figure 1A:
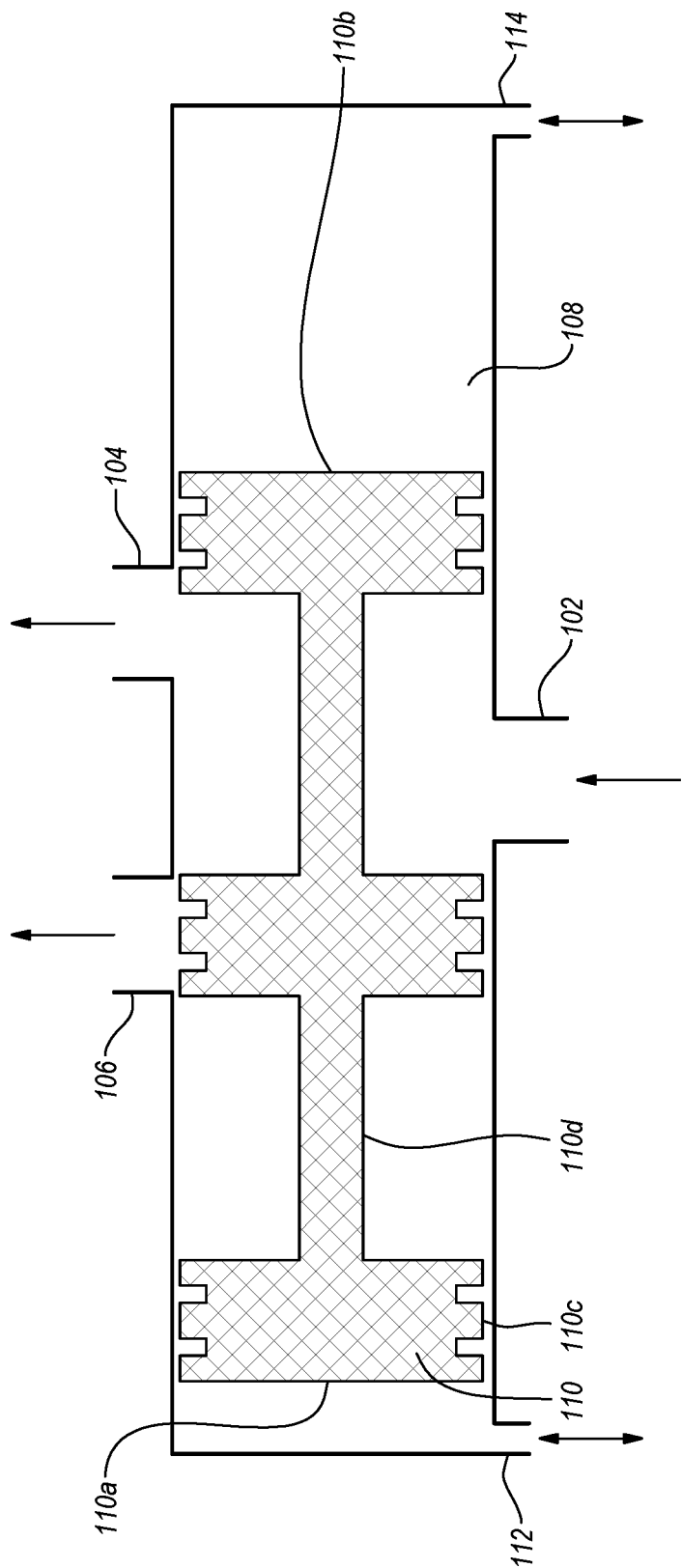
FIGS. 1a-1c are diagrams of an example directional control valve, with the spool shown in a variety of positions.

The present disclosure is generally concerned with fluid system components. More specifically, at least some of the disclosed embodiments concern control valves configured to be operated by a control fluid. Some example embodiments can be used in hydraulic systems or pneumatic systems, although neither is required and the scope of the invention is not limited to any particular uses or applications of control valves. Yet other example embodiments can be used to control the flow of a control fluid, such as air or an inert gas for example, that controls the operation of a component such as a pump, which may be a diaphragm pump in some embodiments.

A. General Aspects of Some Example Embodiments

In general, at least some control valve embodiments take the form of directional control valves. Such directional control valves can have any number and combination of ports, working positions, and normal positions. As well, directional control valves can have sliding spools, or rotary spools. The directional control valves can be used with any of a variety of different system fluids, examples of which are disclosed herein. Moreover, the control fluid used for operation of a direction control valve can be any type of fluid.

As used herein, a port refers to an opening in a component by way of which a control fluid enters and/or exits the component. In general, one or more ports are arranged for fluid communication with a chamber, or bore, that houses the spool so that a pressurized control fluid can act on the spool to implement operation of the component by moving the spool to one or more operating positions of the component. The component may additionally define one or more fluid passageways in fluid communication with at least one inlet and one outlet such that process fluid can flow into, through, and out of, the component.

The number of positions refers to the number of operating positions that can be assumed by the spool. There may be one, two, three, four, or more, operating positions, as well as one or more normal positions. The normal position refers to a position to which the spool returns when the valve is not being operated, that is, when the spool is not in an operating position. In at least some embodiments of a directional control valve, two operating positions are provided for, although more or fewer operating positions could alternatively be employed. Control valves can be classified using the X/Y nomenclature, where X refers to the number of ports, and Y refers to the number of different spool positions, that is, operating positions.

One simple implementation within the scope of the invention is a two way, two position (2/2) valve that includes first and second fluid ports arranged so that when one port is closed off by the spool, the other port is open. In some implementations, movement of the spool back and forth within a chamber can be effected by a control fluid introduced at opposite ends of the spool through respective inlet/outlet connections. In other implementations, the control fluid can be introduced in such a way as to contact other portions of the spool, rather than the end(s) of the spool Some embodiments of the spool include sealing elements so that the control fluid and process fluid do not mix with each other. Other embodiments of the spool omit sealing elements.

Movement of the spool can be controlled with a control fluid, including any of the fluids disclosed herein. The directional control valve can also include sensors and other components to gather and transmit feedback concerning the operation of the directional control valve.

The fluid system components disclosed herein, including directional control valves, can be used to control the flow of a variety of different process fluids. Some examples of process fluids include, but are not limited to, deionized (DI) water, corrosive agents and materials including but not limited to acids and bases, gases such as compressed air or inert gas for example, combinations of gases, other fluids, and combinations of any of the foregoing. Such fluids may be hot, highly pressurized, reactive, and/or pure fluids. Note that as used herein, "fluid" embraces gases, liquids, combinations of gases and liquids, and combinations of one or more gases and/or one or more liquids with solids. As such, "fluid" embraces compressible fluids, incompressible fluids, and combinations of one or more compressible fluids and/or one or more incompressible fluids.

The fluid system components disclosed herein may be constructed with a variety of components and materials including, but not limited to, non-reactive and substantially non-reactive materials, non-metallic and substantially non-metallic materials, rubber, plastics such as polymers, and composites. It should be noted that non-reactive and substantially non-reactive materials embrace a variety of materials, including both metals, such as stainless steel for example, as well as non-metallic materials, such as plastics for example. Examples of the aforementioned polymers may include perfluoroalkoxy (PFA) and polytetrafluoroethylene (PTFE), which can be machined or otherwise formed into various components, such as pump bodies, pump heads, and diaphragms for example. Fluoroelastomers (FKM), and perfluoroelastomers (FFKM) may also be employed. These materials may or may not be virgin materials.

In certain applications, metals such as steel including stainless steel, copper, titanium, brass, nickel, aluminum, and alloys and combinations of any of the foregoing metals, may be used in the construction of the fluid system components disclosed herein. Examples of such alloys include copper-nickel alloys (CNA), and nickel-copper alloys (NCA).

B. Aspects of an Example Control Valve

Figure 1B:
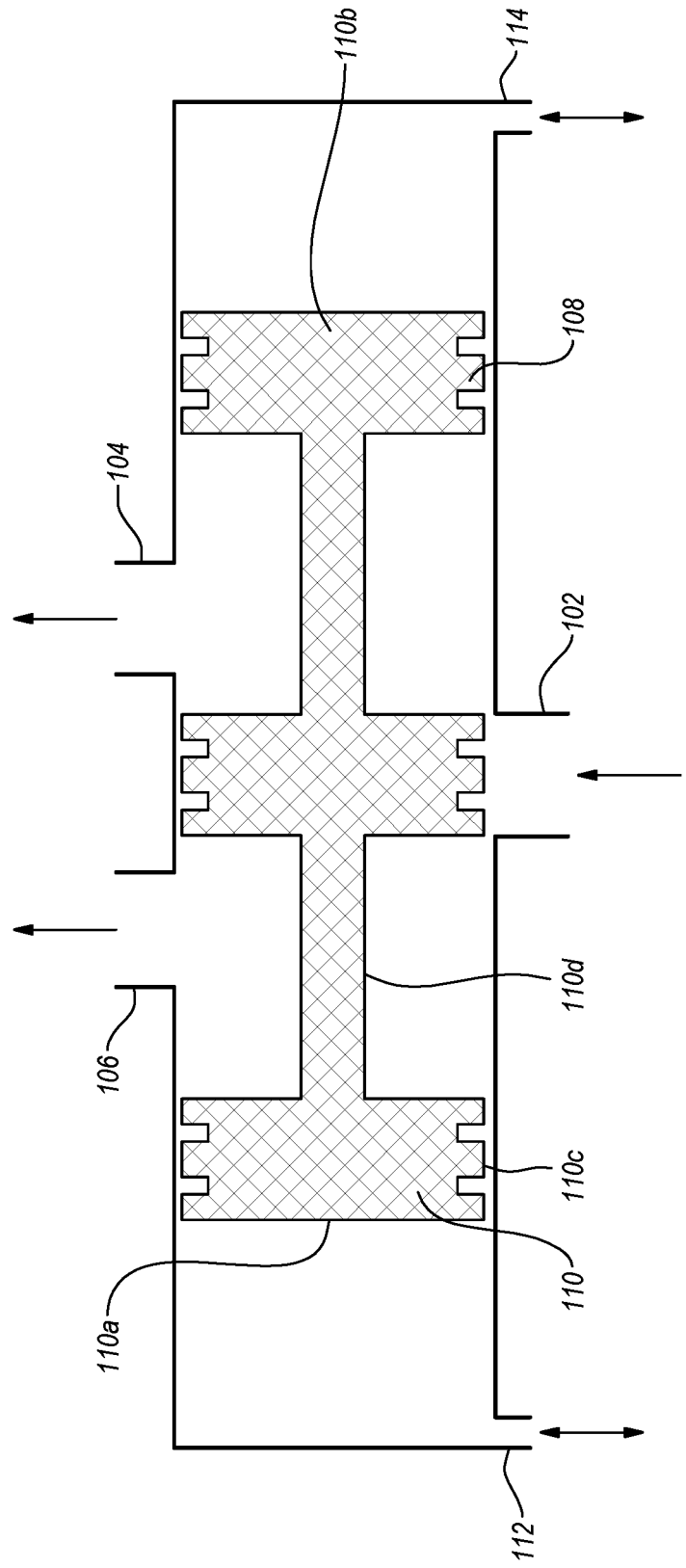
Figure 1C:
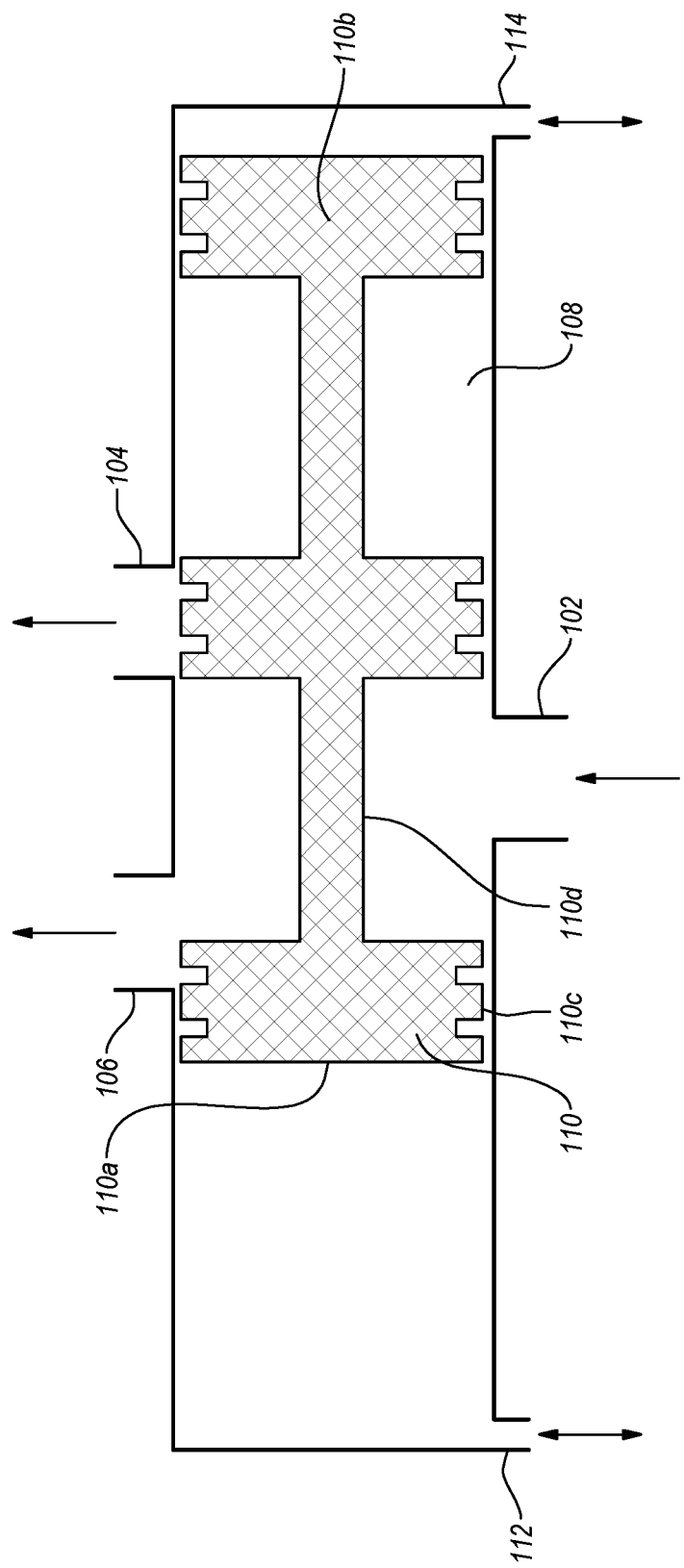
Figure 3A:
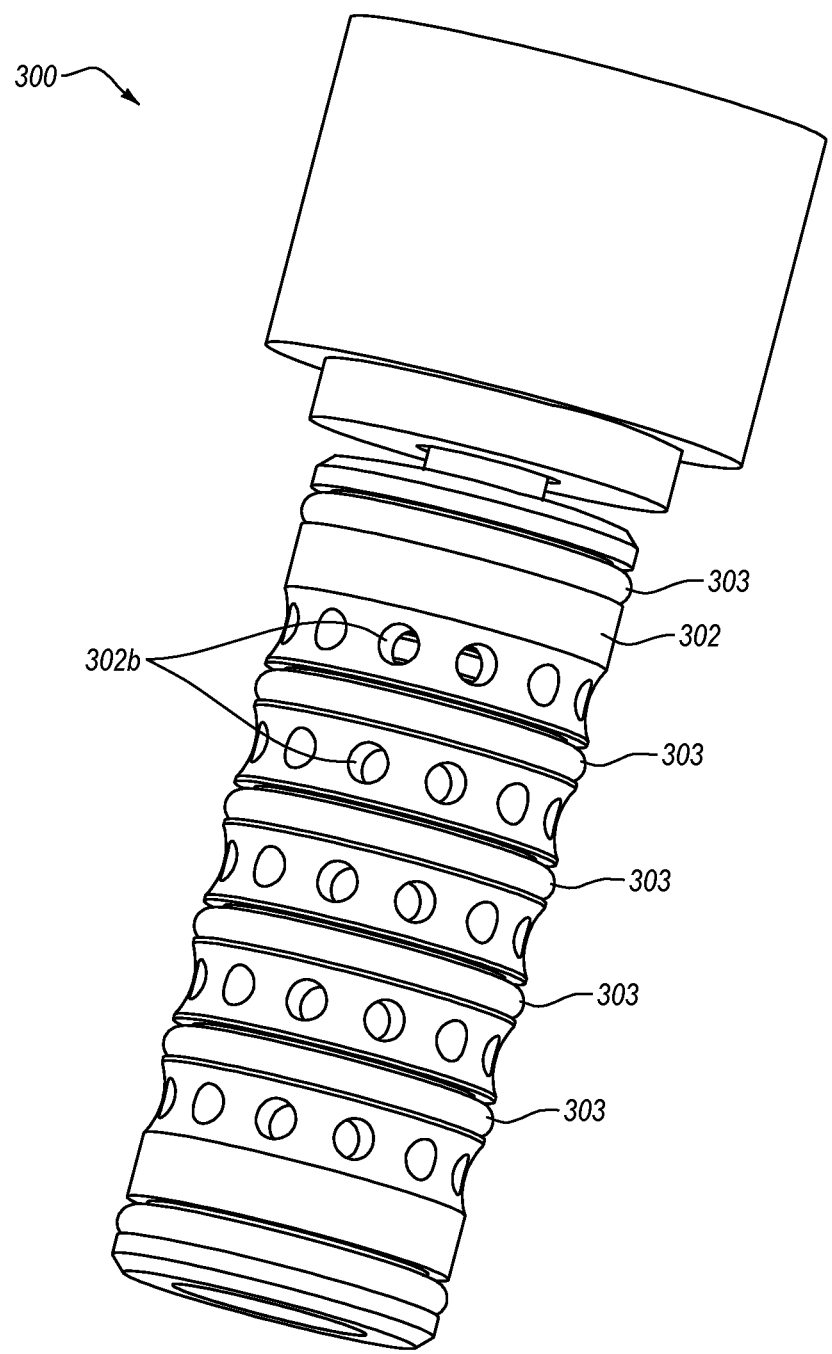
FIGS. 3a-3f disclose aspects of an embodiment of a directional control valve.
Figure 3B:
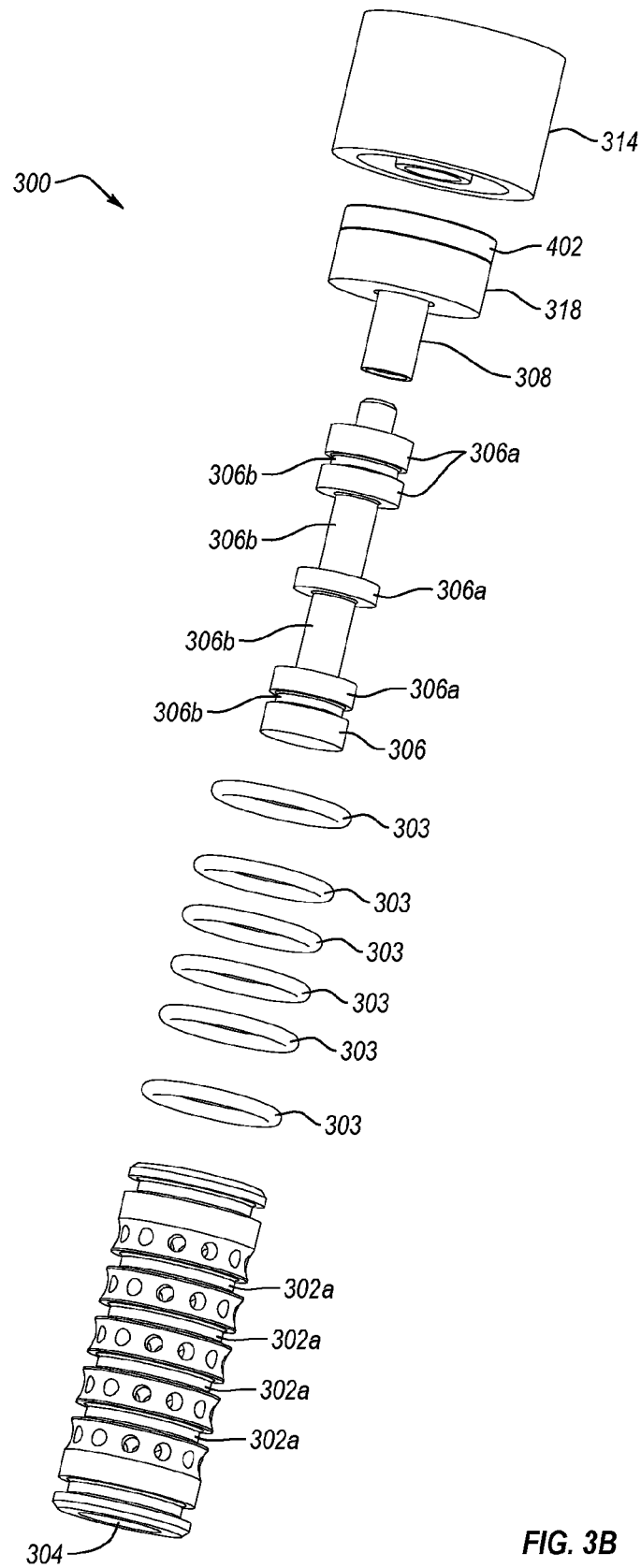
Figure 3C:
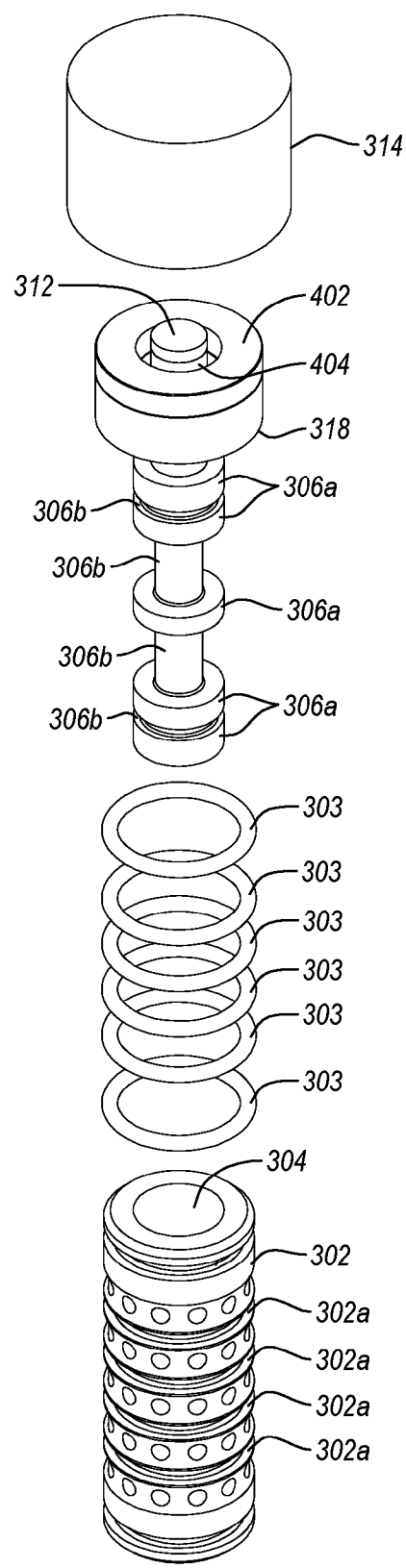
Figure 3D:
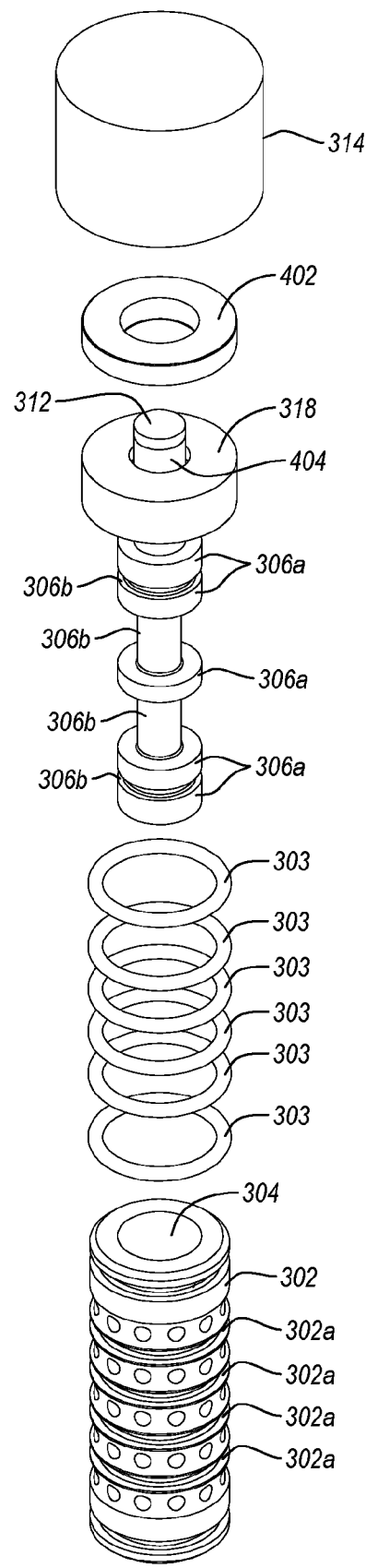
Figure 3E:
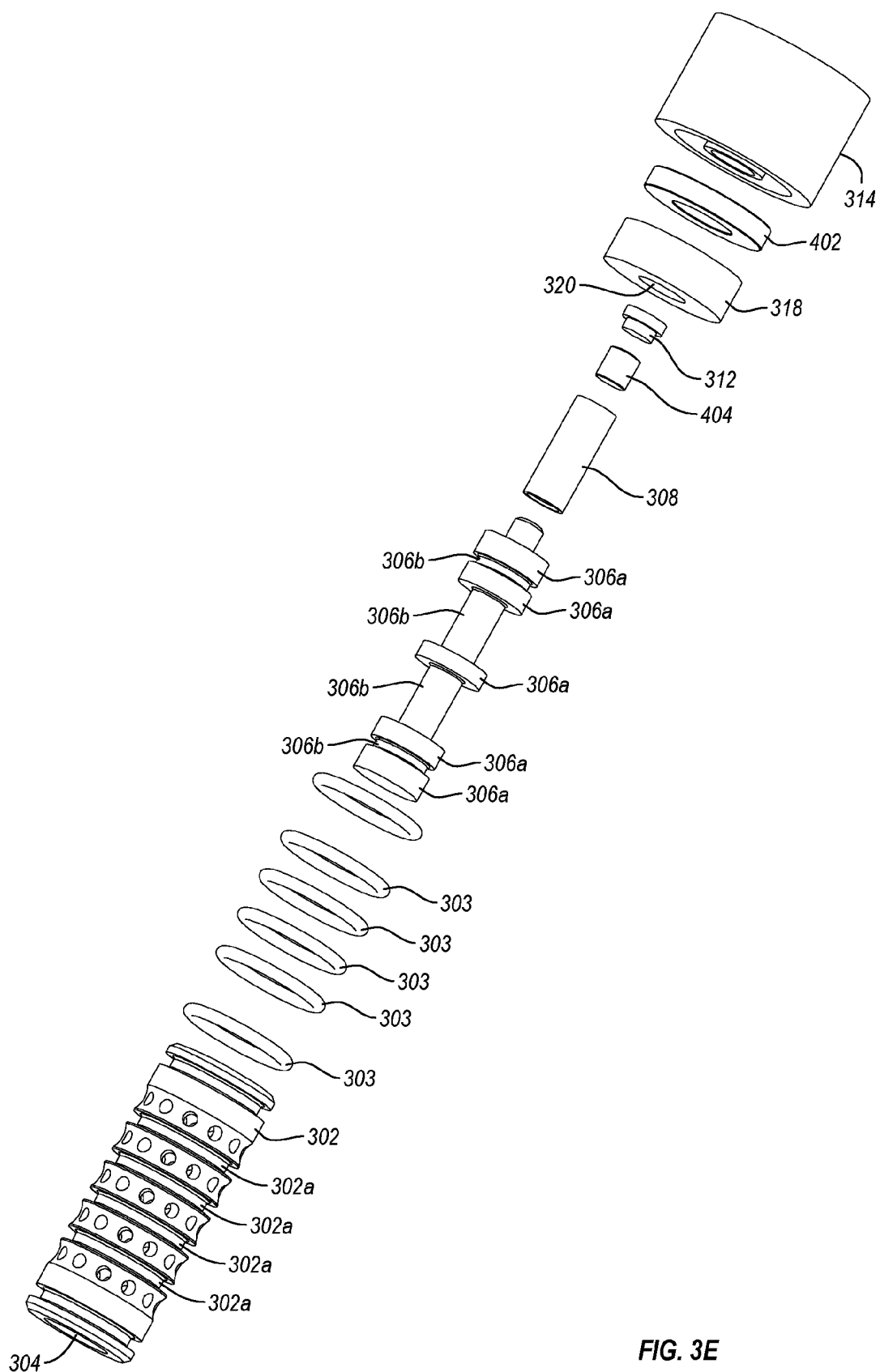
Figure 3F:
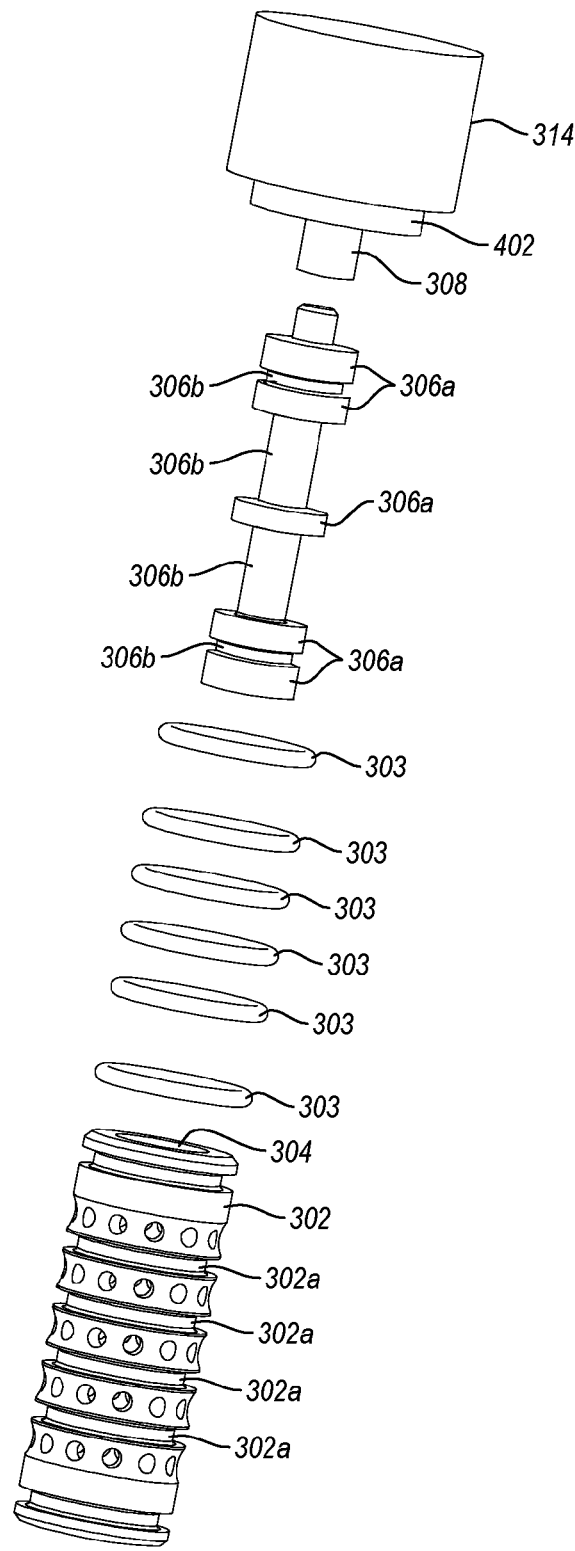

With reference now to FIGS. 1a-1c, details are provided concerning control valves, one example of which is a directional control valve indicated generally at 100. The directional control valve 100 can be a stand-alone component, or can be included as an element of another fluid system component, such as a diaphragm pump for example.

In general, a direction control valve can be used to change the direction of flow of a fluid, such as a process fluid for example. Thus, the example directional control valve 100 includes an inlet port 102 and first and second outlet ports 104 and 106 through which flow can alternatively be directed to different respective destinations. All of the ports 102-106 are arranged for fluid communication with a chamber, or bore, 108 that houses a spool 110. The spool 110, which can have a generally cylindrical outline in this example, is configured to move back and forth within the chamber 108 under the influence of the pressure of a control fluid, which can pressurized control fluid is directed to one or the other of opposing surfaces 110a and 110b of the spool 110 and this application of pressure causes movement of the spool 110 away from one position, such as a first operating position, and toward another position, such as a second operating position.

The spool 110 is configured with both lands 110c and grooves 110d. In general, the lands 110c serve to block the fluid of fluid through one or the other of ports 104 or 106, depending upon the position of the spool 110 in the chamber 108. On the other hand, the grooves 110d permit fluid to flow around the spool 110 from the port 102 to one or the other of ports 104 or 106, again depending upon the position of the spool 110 in the chamber 108. In the example of FIGS. 1a-1c, the spool 110 has two operational, or working, positions. The first operational position in which flow passes through port 104 is shown in FIG. 1a, and the second operational position in which flow passes through port 106 is shown in FIG. 1c. A center position of the spool 110 is indicated in FIG. 1b.

With particular reference to FIG. 1b, the spool 110 may pass through a center position in which, depending upon the configuration of the control valve 100, both ports 104 and 106 are closed or partly closed, or both ports 104 and 106 are open or partly open. If the spool 110 should remain in such a center position, the control valve 100 may be considered to be in a stall condition since the control valve is stuck between the first and second operational positions. Such a stall condition detracts from the operational effectiveness of the control valve. Thus, it is useful to configure a control valve in a way that will prevent the spool from remaining in a center position, or other stall position(s).

Accordingly, and with reference now to FIG. 2, and continued reference to FIG. 1, details are provided concerning a mechanism 200 that serves to prevent a spool from remaining in a position between first and second operating positions. In particular, the mechanism may either comprise, or consist of, a first magnet 202 and a second magnet 204. In general, and as indicated in FIG. 2, the magnets 202 and 204 are oriented with like poles, namely north and south, of both facing the same direction. The magnets 202 and 204 can be any size, shape or configuration. In the illustrated example, magnet 202 is ring-shaped and magnet 204 is in the shape of a disk that is concentric with magnet 202. In at least some embodiments, the magnets 202 and 204 are both permanent magnets and, as such, can be made of any suitable magnetic material(s).

As shown in the upper view of FIG. 2, the arrangement of the magnets 202 and 204 in that view is such that a net upward force acts on the magnet 204. In the lower view, the arrangement of the magnets 202 and 204 is such that a net downward force acts on the magnet 204. Thus, the direction of action of the net force changes depending upon the positions of the magnets 202 and 204 relative to each other. In the middle view of FIG. 2, an unstable center position is indicated in which there is no, or negligible, net force exerted on the magnet 204. Due to the arrangement of the magnets 202 and 204, and their poles, the magnets 202 and 204 will tend toward either the arrangement shown in the top view or the arrangement shown in the bottom view. As discussed below, this has useful implications where the operation of a control valve is concerned.

Turning now to FIGS. 3a-3f, and with continued reference to FIGS. 1a-1c and 2, a control valve is disclosed, one example of which is denoted at 300. In general, the control valve 300 can be similar in its configuration and operation to the example control valve 100 disclosed in FIG. 1. Thus, the control valve 300 includes a body 302 that defines a chamber 304 within which a spool 306 is slidingly received. The spool 306 includes a plurality of lands 306a and grooves 306b arranged for selective alignment with one or more ports of the control valve 300, as discussed in more detail below. As collectively indicated by FIGS. 5a-5c, discussed below, the spool 306 can cooperate with the body 302 to define a plurality of different flow configurations through the control valve 300.

As further indicated, the body 302 can include one or more grooves 302a, each of which is configured to receive a corresponding sealing element 303, which can take the form of an O-ring for example. Other configurations and arrangements of sealing elements 303 can alternatively be used however. For example, in some embodiments, the body 302 can act as a sealing element if the body 302 is press-fit into a bore, such as bore 316.

With continued reference to FIGS. 3a-3f, further details are provided concerning the example control valve 300. In particular, the control valve 300 includes first and second magnets 402 and 404. In the illustrated example, the magnet 404 is mounted indirectly to the spool 306, although other arrangements of the magnet 404 and spool 306 are possible. For example, in some alternative arrangements, the magnet 404 is attached directly to the spool 306. As well, in some embodiments, one or both of the magnets 402 and/or 404 can be a molded element, such as an injection molded magnet for example. Such molded magnets can be made with a variety of materials including, for example, ferrite, neodymium-iron-boron, or blends of magnetic materials. Suitable binder types include, for example, nylon 6 (polycaprolactam), nylon 12 (a polymer with the formula $[(CH_2)_{11}C(O)NH]_n$), polyphenylene sulfide (PPS), and polyamide.

In more detail, a mount 308 is provided that is attached to the spool 306. The mount 308 can be permanently, or removably, attached to the spool 306. By way of illustration, the mount 308 can be press-fit onto the spool 306 in some embodiments. In at least some embodiments, the lower end of the mount 308 includes internal threads (not shown) that engage corresponding external threads (not shown) of the spool 306. In other embodiments, the mount 308 can be welded or brazed to the spool 306. The opposing end of the mount 308 defines a cavity 310 in which the magnet 404 can be received. In at least some embodiments, the mount 308 includes a cap 312, which can be threaded, that confines the magnet 404 in the cavity 310. In other embodiments, the cap 312 can be welded or brazed, or otherwise permanently attached, to the mount 308.

As well, the control valve 300 includes a valve head 314 that defines a bore 316 in which the cap 312 and a portion of the mount 308 are slidingly received. Particularly, in operation, as the spool 306 moves back and forth in the chamber 304, the cap 312, the magnet 404, and the portion of the mount 308, likewise move within the bore 316 between the positions respectively shown FIGS. 5a-5c, as discussed below.

The bore 316 can be cylindrical in form, but that is not required, and any other suitable shape(s) could be use. In the example of FIGS. 3a-3f, the diameter of the bore 316 is relatively smaller than the diameter of the chamber 304, although an opposite, or other, arrangement could alternatively be implemented. In some embodiments, the pressurized control fluid can be introduced into the bore 316 when, for example, it is desired to move the spool 306 to the position shown in FIG. 5a.

Finally, a retainer 318 is provided which can be permanently or releasably connected to the valve head 314 such as by a press-fit, welding or brazing, or with threads, respectively. The retainer 318 is configured with an opening 320 that accommodates the mount 308, and the retainer 318 confines the magnet 402 within a corresponding recess 322 defined by the valve head 314. In some embodiments, the magnet 402 can be a molded element, that is molded into the recess 322, such as by injection molding for example. As well, the magnet 404 can also take the form of a molded element. In some embodiments, the retainer 318 can be backed out of the valve head 314 so that a relatively larger more powerful magnet can be installed in the valve head. Such a more powerful magnet may increase the biasing force applied to the spool 306.

With reference now to FIG. 4, further details are provided concerning the body 302 of the control valve 300. In some embodiments, the body 302 and/or the spool 306 can each consist of, or comprise, a ceramic material. In other embodiments, and as is the case regarding all the other components of the control valve 300, except sealing elements 303, the body 302 can be made of any suitable metal, combination of metals, or ceramic. In still other alternative embodiments, the body 302 and/or any other component(s) of the control valve 300 can be made of plastic, or ceramic.

As shown in FIG. 4, the body 302 can be generally cylindrical in shape. The body 302 may include a plurality of holes or perforations 302b that are configured and arranged for fluid communication with the chamber 304. As a result of this configuration and arrangement, fluid can flow into and/or out of the chamber 304 by way of the perforations 302b. As such, a group of one or more of the perforations 302b can define a port of the body 302. Thus, as best shown in FIGS. 5a-5c, fluid entering or exiting the chamber 304 in this way can flow through the spool 306 by way of the grooves 306b. While the example of FIG. 4 indicates that all of the perforations 302b are the same size, have a generally circular shape, and are arranged in equally spaced groups about the circumference of the body 302, this configuration and arrangement is not required. More generally, any size, number, orientation, and configuration of perforations 302b can be employed, and the scope of the invention is not limited to the example body 302 configuration of FIG. 4.

With reference now to FIGS. 5a-5c, details are provided concerning operational aspects of the control valve 300. In general, the spool 306 can assume a first working position, as shown in FIG. 5a, and can also assume a second working position, as shown in FIG. 5c. As the spool 306 moves between the two working positions, it passes through a 'center' position, shown in FIG. 5b.

It was noted earlier that it is desirable that the spool 306 not remain in the center position during operation. Thus, the first and second magnets 402 and 404 may help to prevent a circumstance in which the spool 306 remains in, or near, a center position during operation. In at least some embodiments, both magnet 402 and magnet 404 are permanent magnets while, in other embodiments, the magnet 402 is an electromagnet and magnet 404 is a permanent magnet.

In general, the magnets 402 and 404 are oriented with their poles as shown in FIG. 2, and one magnet, such as magnet 404 is concentrically mounted to the spool 306 while the other magnet, such as magnet 402, is mounted to a portion of the body 302, whether on the inside of the body 302 or on the outside of the body 302, and disposed in such a way that the center position of the spool 306 in FIG. 5b corresponds to the magnets 402 and 404 being oriented in the unstable arrangement shown in the middle view of FIG. 2, in which no significant net force is exerted on the magnet 404. As will be apparent, this result can be achieved with any of a variety of different magnet configurations and arrangements and, accordingly, the scope of the invention is not limited to the illustrative example disclosed in FIG. 3.

It should be understood that as used herein, a 'center' position is not limited solely to a single midway position of the spool between a first operating position and a second operating position. Rather, the 'center' may embrace a range of multiple different intermediate spool positions that exist between a first operating position and a second operating position. As well, these intermediate spool positions are positions at which there is little, or no, significant net force exerted on the magnet that is mounted, attached, or otherwise connected to, the spool.

As further indicated in FIG. 5b, a pressurized control fluid can be applied to and/or removed from various portions of the spool 306 so as to effect movement of the spool 306 within the chamber 304. In the example of FIG. 5b, the pressurized control fluid can be introduced at the top and/or bottom of the spool 306. In general, introduction of the pressurized control fluid at the bottom of the spool 306 as shown in FIG. 5b will tend to move the spool 306 upward toward the operating position shown in FIG. 5c, while introduction of the pressurized control fluid near the top of the spool 306 as shown in FIG. 5b will tend to move the spool 306 downward toward the operating position shown in FIG. 5a. In each case, the spool 306 passes through the position indicated in the 'center' view. As best shown in the 'bottom' view and the 'top' view, the control valve body 302 is configured to limit the range of motion of the spool 306 in either direction.

In some instances, when pressurized control fluid is introduced to one end of the spool 306, the pressure exerted by the pressurized control fluid on the other end of the spool 306 is relieved, at least in part, so that a pressure differential on the spool 306 is created. This pressure differential causes movement of the spool 306 in the direction that the higher pressure is exerted. By reversing the direction of the pressure differential, the spool 306 can be moved back and forth between operating positions, such as the operating positions respectively shown in FIG. 5a and FIG. 5c.

With continued reference to FIGS. 5a-5c, and particularly FIGS. 5a and 5b, it can be seen that as the control fluid pushes the spool 306 downward, the spool 306 passes through the 'center' position (FIG. 5b). As the result of the configuration and arrangement of the magnets 402 and 404, once the spool 306 crosses the 'center' position, the opposing polarity of the magnets 402 and 404, in cooperation with the pressure exerted by the control fluid, urges the spool 306 downward to the operating position indicated in FIG. 5a. A similar effect occurs as the spool 306 moves upward into the operating position indicated in FIG. 5c. Due to the polarity and arrangement of the magnets 402 and 404, the 'center' position (FIG. 5b) of the spool 306 is relatively unstable and, thus, the magnets 402 and 404 tend to urge the spool 306 out of the 'center' position and toward one or the other of the operating positions indicated in FIGS. 5a and 5c, respectively.

Thus, over the course of a single cycle of the spool 306, for example between the operating positions respectively shown in FIG. 5a and FIG. 5c, the magnets 402 and 404 cooperate to bias the spool 306 first toward the 'bottom' position (FIG. 5a) and then toward the 'top' position (FIG. 5c). Put another way, the biasing effect afforded by the magnets 402 and 404 is bidirectional, that is, the bias is exerted on the spool 306 in two different opposing directions, for example, along a longitudinal axis defined, for example, by the chamber 304 in which the spool 306 is situated. In the example of FIGS. 5a-5c, the two different directions are opposite each other.

In more detail, when the spool 306 is in position indicated in FIG. 5a, the magnets 402 and 404 cooperate to bias the spool 306 toward, and to be retained in, that position and, at the same time, the spool 306 is correspondingly biased by cooperation of the magnets 402 and 404 away from the position indicated in FIG. 5c. When the control fluid is permitted to exert pressure on the spool 306 so as to move the spool 306 out of the position shown in FIG. 5a, the bias exerted by the magnets 402 and 404 on the spool 306 toward that position is overcome and the spool 306 then moves through the 'center' position (FIG. 5b) and into the position shown in FIG. 5c.

As the spool 306 moves toward the position shown in FIG. 5c, the magnets 402 and 404 cooperate to bias the spool 306 toward that position and also bias the spool 306 to be retained in that position once there and, correspondingly, the spool 306 is simultaneously biased away from the position shown in FIG. 5a. Thus, as the spool 306 moves through a single cycle between the 'bottom' and 'top' positions shown in FIGS. 5a and 5c, respectively, the bias exerted on the spool 306 by the magnets 402 and 404 alternates from being exerted in a first direction to being exerted in a second direction. In the example of FIGS. 5a-5c, the first and second directions are opposite of each other. It will thus be apparent from this disclosure that the biasing of the spool 306 in two different directions over the course of a single cycle of the spool 306 can be accomplished, in some embodiments at least, with no more than a single set of magnets comprising, or consisting of, first and second magnets, such as magnets 402 and 404.

With continued reference to FIGS. 5a-5c, it can be seen that both of the magnets 402 and 404 are located proximate the same end of the spool 306, specifically, the top end of the spool 306. The scope of the invention is not limited to this configuration however. For example, in other embodiments, the magnets 402 and 404 can both be located proximate the bottom end of the spool 306. More generally, the magnets 402 and 404 can be located wherever they will provide the biasing functionality disclosed herein. Thus, the specific arrangements set forth in this disclosure are provided solely by way of example and are not intended to limit the scope of the invention in any way.

As is also apparent from FIGS. 2 and 5a-5c, the magnets 402 and 404 can be configured and arranged such that in some circumstances, one magnet, such as magnet 404 can at least temporarily reside partly, or completely, within a recess or opening defined by another magnet, such as magnet 402. As well, the magnets 402 and 404 can be configured and arranged such that in some circumstances, one magnet, such as magnet 404, passes at least partway through a recess or opening defined by another magnet, such as magnet 402. More generally, the magnets 402 and 404 may, in some circumstances, overlap each other along an axis defined by the direction of travel of the spool 306.

Consistent with the present disclosure, the magnets 402 and 404 collectively form one example physical implementation of a means for biasing a spool. Among other things, the means may prevent a spool, which may be otherwise free to move, from remaining in an intermediate position between first and second operating positions. Any other structure(s) capable of performing this function are considered to fall within the scope of the present disclosure. Such a means may also, as disclosed herein, serve to bias the spool in one or both of two different directions, which may be opposite directions.

Figure 6:
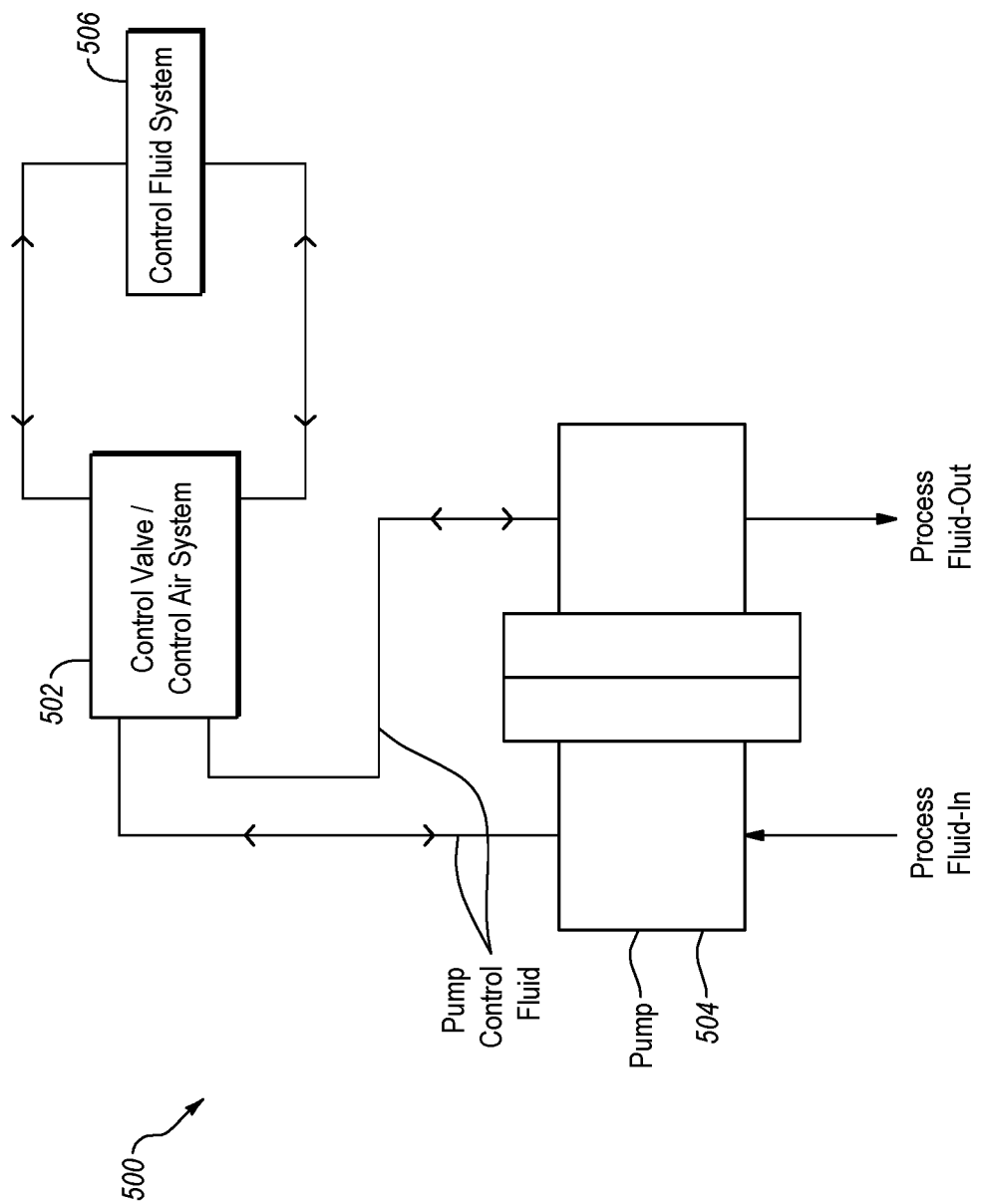
FIG. 6 is a schematic of an example system where a directional control valve could be used.

With reference now to FIG. 6, details are provided concerning an example system 500 that includes a control valve 502 that controls the flow of control air, or any other control fluid, to a pump 504, such as a diaphragm pump for example. The control valve 502, which can be any of the control valves disclosed herein, can include a spool (not shown) whose movement is controlled by a control fluid system 506, as disclosed elsewhere herein. By alternatively supplying control air, or any other suitable control fluid, to opposite sides of a diaphragm (not shown) in the pump 504, the control valve 502 can effect movement of the diaphragm to move fluid into and out of the pump 504.

C. Advantageous Aspects of Some Embodiments

As will be apparent from the disclosure, one or more embodiments of the invention can provide one or more advantageous and unexpected effects, in any combination, some examples of which are set forth below. It should be noted that such effects enumerated herein are neither intended, nor should be construed, to limit the scope of the claimed invention in any way.

For example, one or more embodiments of the invention may be advantageous inasmuch as they provide for a control valve, such as a directional control valve for example, that is configured such that an associated spool tends to be urged away from a center position and toward one or more alternative operating positions. As another example, a set of two or more magnets can be used to impart the aforementioned motion to the spool and/or to complement the motion imparted to the spool by a control fluid. Further, the use of magnets largely, if not completely, eliminates the problems typically associated with devices such as springs, where such problems include mechanical wearing of the springs and/or contacting components, as well as the time and expense involved in replacement of the springs.

D. Some Further Example Embodiments

Embodiment 1

A fluid system component, comprising:
a body defining a chamber;
a spool disposed in the chamber and configured to move within the chamber, wherein a first operating position of the fluid system component is defined when the spool is in a first position in the chamber, and a second operating position of the fluid system component is defined when the spool is in a second position in the chamber; and
a magnetic element connected to the spool and responsive to a magnetic field such that the spool is biased in a first direction when the spool is in the first position and the spool is biased in a second direction when the spool is in the second position, and the second direction is different from the first direction.

Embodiment 2

The fluid system component as recited in embodiment 1, wherein like poles of the magnetic field and the magnetic element face the same direction.

Embodiment 3

The fluid system component as recited in embodiment 1, wherein the magnetic field is imposed by a magnetic element located proximate the fluid system component.

Embodiment 4

The fluid system component as recited in embodiment 1, wherein the magnetic field is imposed by a magnetic element connected to the fluid system component.

Embodiment 5

The fluid system component as recited in embodiment 1, wherein the fluid system component is configured to enable a pressurized operating fluid to be introduced at two different locations on the spool.

Embodiment 6

The fluid system component as recited in embodiment 1, wherein the magnetic element is responsive to the magnetic field so as to facilitate prevention of the occurrence of a stall condition in which the spool remains in an intermediate position between the first operating position and the second operating position.

Embodiment 7

The fluid system component as recited in embodiment 1, wherein the second direction is opposite the first direction.

Embodiment 8

A valve, comprising:
a body defining a chamber;
a spool disposed in the chamber and configured to move within the chamber, wherein a first operating position of the valve is defined when the spool is in a first position in the chamber, and a second operating position of the valve is defined when the spool is in a second position in the chamber; and
a first magnetic element carried by the spool and a second magnetic element connected to a part of the valve, wherein the first magnetic element and the second magnetic element are configured and arranged such that over the course of a single cycle of the spool between the first operating position and the second operating position, the first magnetic element and the second magnetic element cooperate to bias the spool in two different directions.

Embodiment 9

The valve as recited in embodiment 8, wherein one of the magnetic elements is a permanent magnet.

Embodiment 10

The valve as recited in embodiment 8, wherein the direction in which the spool is biased depends upon the position of the spool in the chamber.

Embodiment 11

The valve as recited in embodiment 8, wherein the first magnetic element and second magnetic element are configured and arranged so that they tend to assume one or the other of two misaligned orientations relative to each other.

Embodiment 12

The valve as recited in embodiment 8, wherein over the course of a single cycle of the spool, one of the magnetic elements passes partway through an opening defined by the other of the magnetic elements.

Embodiment 13

The valve as recited in embodiment 8, wherein like poles of the first magnetic element and the second magnetic element face the same direction.

Embodiment 14

A valve, comprising:
a body defining a chamber;
a spool disposed in the chamber and configured to move within the chamber, wherein a first operating position of the valve is defined when the spool is in a first position in the chamber, and a second operating position of the valve is defined when the spool is in a second position in the chamber; and
means for biasing the spool, wherein over the course of a single cycle of the spool between the first operating position and the second operating position, the means for biasing the spool biases the spool in two different directions.

Embodiment 15

The valve as recited in embodiment 14, wherein the means for biasing the spool prevents the spool from remaining in a position in the chamber that corresponds to a stall condition.

Embodiment 16

The valve as recited in embodiment 14, wherein the means for biasing the spool employs a magnetic field to impose the bias on the spool.

Embodiment 17

The valve as recited in embodiment 14, wherein the first direction is a direction toward the first operating position, and the second direction is a direction toward the second operating position.

Embodiment 18

The valve as recited in embodiment 14, wherein the means for biasing the spool comprises a set of magnetic elements.

Embodiment 19

The valve as recited in embodiment 14, wherein the means for biasing the spool comprises a first magnetic element connected to a portion of the valve, and a second magnetic element carried by the spool, and the valve further comprises:

a mount connected to the spool and defining a cavity within which the second magnetic element is disposed;

a valve head that defines a first recess within which the first magnetic element is disposed, and the valve head defining a bore that receives part of the mount, the received part of the mount being movable within the bore; and a retainer that is connected to the valve head so as to retain the second magnetic element within the valve head.

Embodiment 20

The valve as recited in embodiment 14, wherein the valve is a directional control valve.

Although this disclosure has been described in terms of certain embodiments, other embodiments apparent to those of ordinary skill in the art are also within the scope of this disclosure. Accordingly, the scope of the disclosure is intended to be defined only by the claims which follow.

What is claimed is:

1. A fluid system component, comprising:
   a body defining a chamber;
   a spool disposed in the chamber and configured to move within the chamber, wherein a first operating position of the fluid system component is defined when the spool is in a first position in the chamber, and a second operating position of the fluid system component is defined when the spool is in a second position in the chamber;
   a mount separate from, and connected to, the spool and configured to move in unison with the spool, the mount defining a cavity that is closed at a first end and open at a second end;
   a cap connected to the mount on the second end; and
   a magnetic element disposed in the cavity and confined in the cavity by the cap and responsive to a magnetic field such that the spool is biased in a first direction when the spool is in the first position and the spool is biased in a second direction when the spool is in the second position, and the second direction is different from the first direction.

2. The fluid system component as recited in claim 1, wherein like poles of the magnetic field and the magnetic element face the same direction.

3. The fluid system component as recited in claim 1, wherein the magnetic field is imposed by another magnetic element located proximate the fluid system component.

4. The fluid system component as recited in claim 1, wherein the magnetic field is imposed by another magnetic element connected to the fluid system component.

5. The fluid system component as recited in claim 1, wherein the fluid system component is configured to enable a pressurized operating fluid to be introduced at two different locations on the spool.

6. The fluid system component as recited in claim 1, wherein the magnetic element is responsive to the magnetic field so as to facilitate prevention of the occurrence of a stall condition in which the spool remains in an intermediate position between the first operating position and the second operating position.

7. The fluid system component as recited in claim 1, wherein the second direction is opposite the first direction.

8. The fluid system component as recited in claim 1, further comprising:
   a valve head that defines a bore that is closed by the valve head at one end and within which a portion of the mount is disposed, and the valve head also defining a recess; and
   another magnetic element disposed in the recess.

9. The fluid system component as recited in claim 8, wherein one of the magnetic elements is a permanent magnet.

10. The fluid system component as recited in claim 8, wherein the magnetic element and the another magnetic element are configured and arranged such that over the course of a single cycle of the spool between the first position and the second position, the magnetic element and the another magnetic element cooperate to bias the spool in two different directions.

11. The fluid system component as recited in claim 1, further comprising another magnetic element, wherein the magnetic element and the another magnetic element are configured and arranged so that they tend to assume one or the other of two different misaligned orientations relative to each other.

12. The fluid system component as recited in claim 11, wherein over the course of a single cycle of the spool, one of the magnetic elements passes partway through an opening defined by the other of the magnetic elements.

13. The fluid system component as recited in claim 1, wherein the first direction is a direction toward the first operating position, and the second direction is a direction toward the second operating position.

14. The fluid system component as recited in claim 1, wherein the fluid system component is a directional control valve.

15. A system, comprising:
   an air-operated diaphragm pump comprising a control air inlet and a control air outlet; and
   the fluid system component as recited in claim 1, which further comprises:
      a first control air connection configured and arranged for fluid communication with the control air inlet of the air-operated diaphragm pump; and
      a second control air connection configured and arranged for fluid communication with the control air outlet of the air-operated diaphragm pump.

* * * * *